(12) United States Patent
Yamaura et al.

(10) Patent No.: US 12,536,568 B2
(45) Date of Patent: Jan. 27, 2026

(54) PARKING CHARGE DEVICE AND PARKING DURATION MANAGEMENT METHOD

(71) Applicant: DENSO CORPORATION, Kariya (JP)

(72) Inventors: Kodai Yamaura, Kariya (JP); Masatake Wada, Kariya (JP); Takamasa Hidaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 401 days.

(21) Appl. No.: 18/190,812

(22) Filed: Mar. 27, 2023

(65) Prior Publication Data
US 2023/0230135 A1 Jul. 20, 2023

Related U.S. Application Data

(63) Continuation of application No. PCT/JP2021/035633, filed on Sep. 28, 2021.

(30) Foreign Application Priority Data

Sep. 30, 2020 (JP) .................................. 2020-165993

(51) Int. Cl.
*G06Q 30/0283* (2023.01)
*B60W 30/06* (2006.01)
*B60W 50/14* (2020.01)
*G06Q 50/40* (2024.01)

(52) U.S. Cl.
CPC ......... *G06Q 30/0284* (2013.01); *B60W 30/06* (2013.01); *B60W 50/14* (2013.01); *G06Q 50/40* (2024.01); *B60W 2556/45* (2020.02)

(58) Field of Classification Search
None
See application file for complete search history.

(56) References Cited

U.S. PATENT DOCUMENTS

2019/0114732 A1* 4/2019 Tanabe ............... G06Q 10/1093
2021/0287542 A1* 9/2021 Maruiwa ................ B60K 35/10
2021/0295609 A1* 9/2021 Noguchi ................ G06Q 10/02

FOREIGN PATENT DOCUMENTS

| CN | 106971615 A | 7/2017 |
| JP | 2004060194 A | 2/2004 |
| JP | 2008242555 A | 10/2008 |
| JP | 2011054116 A | 3/2011 |

* cited by examiner

*Primary Examiner* — Madison R. Inserra
(74) *Attorney, Agent, or Firm* — Harness, Dickey & Pierce, P.L.C.

(57) ABSTRACT

A parking charge device, which charges a parking fee of a target vehicle in a parking lot with automated valet parking service, is configured to: start a count operation for charging purpose when a start condition is satisfied, terminate the count operation when a termination condition is satisfied; calculate a parking fee corresponding to a count value obtained by the count operation; and calculate a temporary parking fee based on the count value at a detection time of an exit request of the target vehicle. When the count operation is terminated within a preset duration, the temporary parking fee is adopted as the parking fee corresponding to the count value.

7 Claims, 15 Drawing Sheets

FIG. 13

TEMPORARY PARKING FEE
IS DETERMINED.

PARKING FEE TO BE CHARGED IS
XX YEN.

PARKING CHARGE DEVICE AND PARKING DURATION MANAGEMENT METHOD

CROSS REFERENCE TO RELATED APPLICATION

The present application is a continuation application of International Patent Application No. PCT/JP2021/035633 filed on Sep. 28, 2021, which designated the U.S. and claims the benefit of priority from Japanese Patent Application No. 2020-165993 filed on Sep. 30, 2020. The entire disclosures of all of the above applications are incorporated herein by reference.

TECHNICAL FIELD

The present disclosure relates to a parking charge device that charges a parking fee for automated valet parking and a parking duration management method.

BACKGROUND

In conventional automated valet parking technology, a management device of the parking lot guides an automated driving vehicle between the boarding/alighting area and a parking position of parking area.

SUMMARY

The present disclosure provides a parking charge device and a parking duration management method. The parking charge device charges a parking fee of a target vehicle in a parking lot with automated valet parking service, and is configured to: start a count operation for charging purpose when a start condition is satisfied, terminate the count operation when a termination condition is satisfied; and calculate a parking fee corresponding to a count value obtained by the count operation. The start condition is set to be satisfied when at least one of following is made: (i) reservation of the parking lot for parking the target vehicle; (ii) detection of a parking request instructed by a user for parking the target vehicle in the parking lot by automated driving; (iii) arrival of the target vehicle at the boarding or alighting area before moving to the parking area; (iv) arrival of the target vehicle at the parking area; or (v) transmission of a parking completion notification, which indicates the arrival of the target vehicle at the parking area, to the user. The termination condition is set to be satisfied when at least one of following is made: (i) detection of an exit request, which is issued by the user and instructs exit of the target vehicle from the parking area by automated driving; (ii) arrival of the target vehicle, which has been parked in the parking area, at the boarding or alighting area; (iii) moving of the target vehicle, which has been parked in the parking area, from the boarding or alight area; (iv) exit of the target vehicle from the parking lot; (v) expiration of a preset reservation duration; (vi) transmission of an exit completion notification, which indicates the arrival of the target vehicle at the boarding or alighting area, to the user; or (vii) transmission of a notification, which indicates reception of the exit request, to the user.

BRIEF DESCRIPTION OF DRAWINGS

Objects, features and advantages of the present disclosure will become apparent from the following detailed description made with reference to the accompanying drawings. In the drawings:

FIG. 13 is a diagraming showing an exemplary display on a portable terminal when the parking fee is temporarily determined;

DETAILED DESCRIPTION

Figure 1:
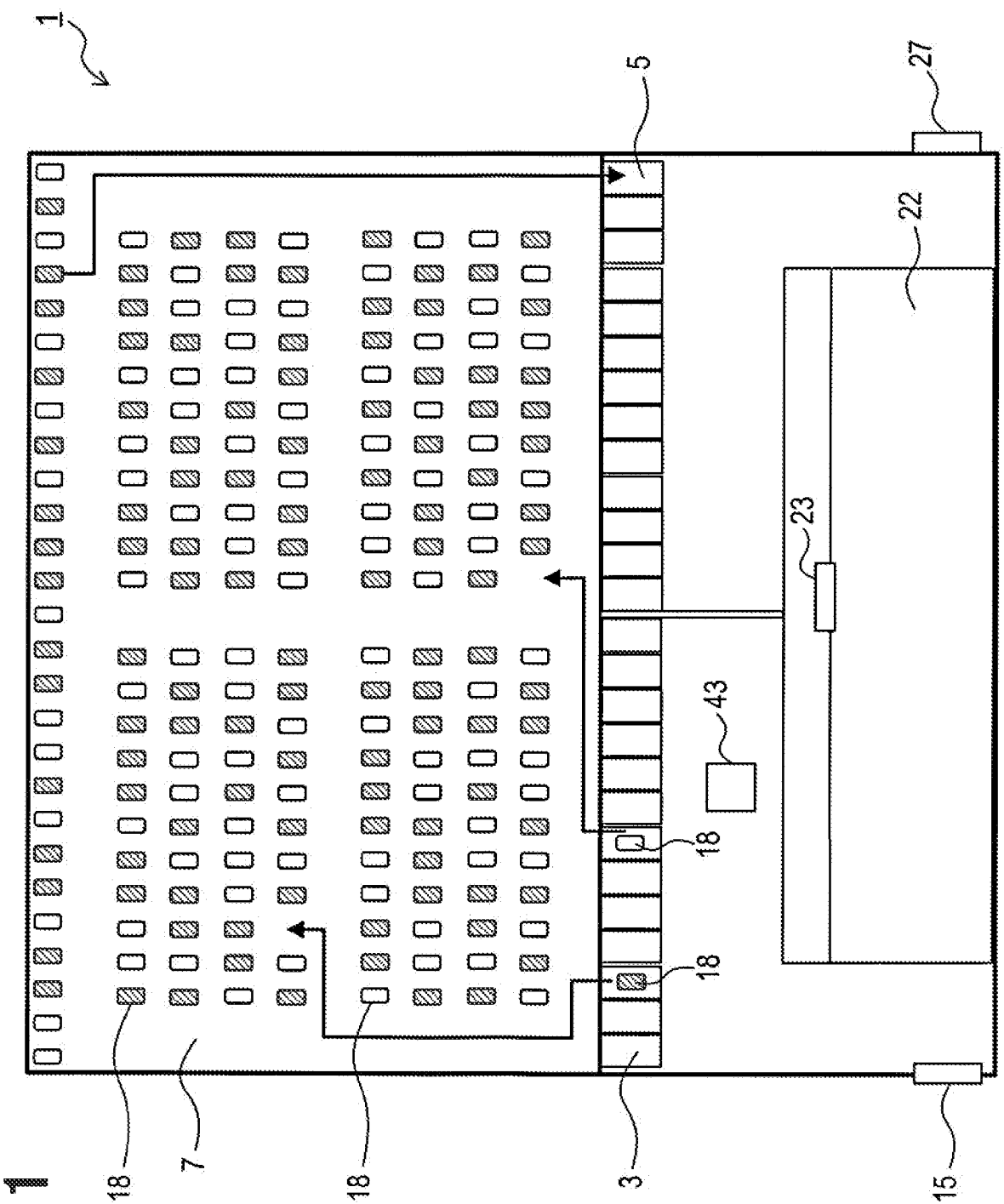
FIG. 1 is a plan view of a parking lot according to the present disclosure.

In a parking lot, usually, parking fee is charged according to a duration from when a vehicle enters the parking lot to when the vehicle exits the parking lot.

After the inventor of the present disclosure studied details about charge for the parking, in automated valet parking, charge of parking fee for the duration from when a vehicle enters the parking lot to when the vehicle exits the parking lot is not proper in some cases. For example, when the parking lot is crowded, there may be a waiting time from when the vehicle enters the parking lot to when the vehicle enters the parking space. Thus, when the parking fee is charged from when the vehicle enters the parking lot, the fee charge may be disadvantageous to the user of parking lot.

According to an aspect of the present disclosure, a parking charge device charges a parking fee of a target vehicle in a parking lot with automated valet parking service. The target vehicle corresponds to a charging target, and moves between a boarding or alighting area and a parking area within the parking lot. The parking charge device includes a count start unit, a count termination unit, and a parking fee calculation unit.

The count start unit starts a count operation for charging purpose in response to a start condition being satisfied. The count termination unit terminates the count operation in response to a termination condition being satisfied. The parking fee calculation unit calculates a parking fee corresponding to a count value obtained by the counting operation.

The start condition is set to be satisfied when at least one of following is made: (i) reservation of the parking lot for parking the target vehicle; (ii) detection of a parking request instructed by the user for parking the target vehicle in the parking lot by automated driving; (iii) arrival of the target vehicle at the boarding or alighting area before moving to the parking area; (iv) arrival of the target vehicle at the parking area; or (v) transmission of a parking completion notification, which indicates the arrival of the target vehicle at the parking area, to the user.

The termination condition is set to be satisfied when at least one of following is made: (i) detection of an exit request, which is issued by the user and instructs exit of the target vehicle from the parking area by automated driving; (ii) arrival of the target vehicle, which has been parked in the parking area, at the boarding or alighting area; (iii) moving of the target vehicle, which has been parked in the parking area, from the boarding or alight area; (iv) exit of the target vehicle from the parking lot; (v) expiration of a preset reservation duration; (vi) transmission of an exit completion notification, which indicates the arrival of the target vehicle at the boarding or alighting area, to the user; or (vii) transmission of a notification, which indicates reception of the exit request, to the user.

The present disclosure excludes a case where the start condition is set to be satisfied in response to entry of the target vehicle into the parking lot and the termination condition is set to be satisfied in response to exit of the target vehicle from the parking lot.

According to the above configuration, a duration other than the duration from when the vehicle enters the parking lot to when the vehicle exits the parking lot is used to calculate the parking fee. Thus, the parking fee can be properly charged for the user of automated valet parking lot. The functions of the count start unit and the count termination unit may be implemented as a parking duration management method.

The following will describe embodiments of the present disclosure with reference to the drawings.

1. First Embodiment (1-1. Configuration of Parking Assist System 1)

Figure 2:
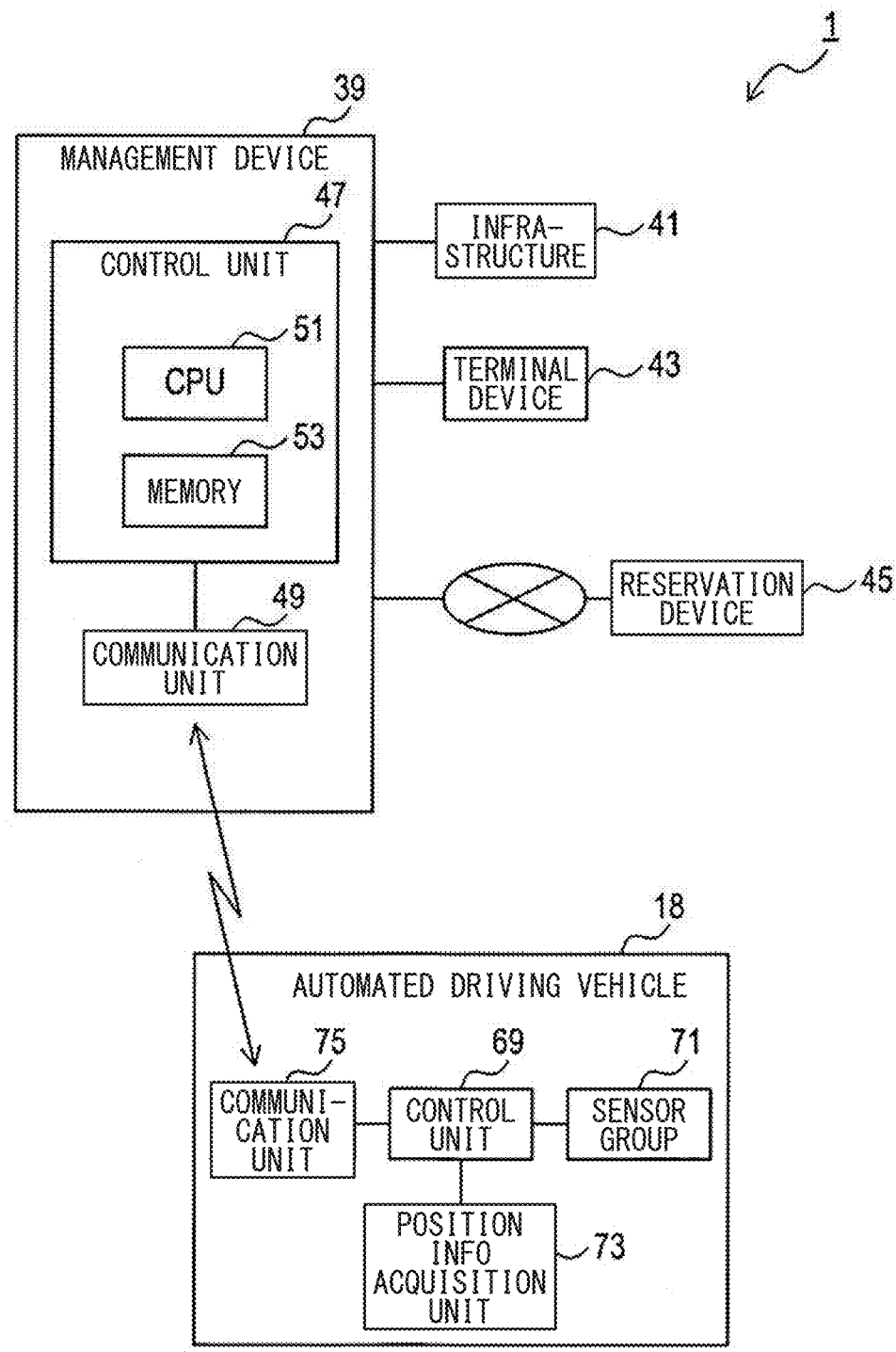
FIG. 2 is a block diagram illustrating a configuration of a parking assist system according to the present disclosure.
Figure 3:
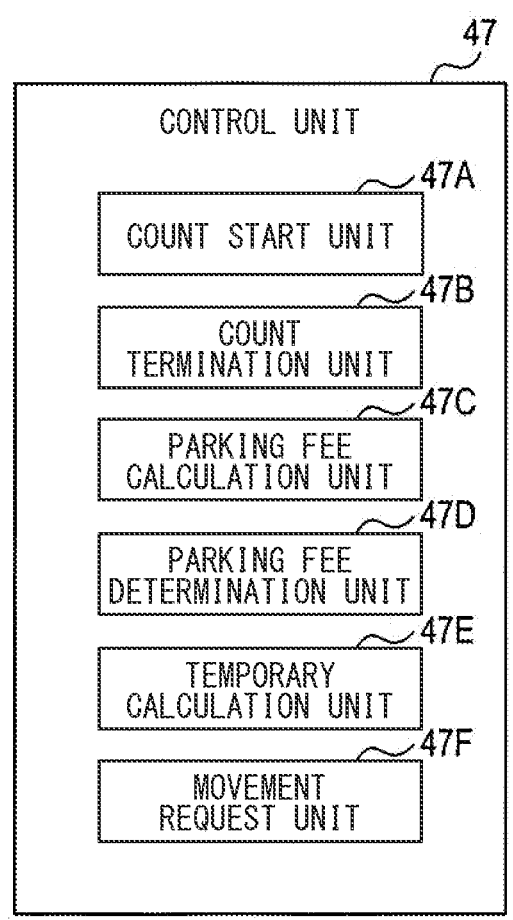
FIG. 3 is a functional block diagram illustrating a control unit of a management device.

The following will describe a configuration of a parking assist system 1 with reference to FIG. 1 to FIG. 3. As shown in FIG. 1, the parking assist system 1 includes an entrance room 3 set in an alighting area where the user alights from the vehicle, and an exit room 5 set in a boarding area where the user boards on the vehicle, and a parking area 7. In the following description, an area including the entrance room 3, the exit room 5, and the parking area 7 is referred to as a parking lot or an automated valet parking lot. The entrance room 3 and the exit room 5 are referred to as a boarding or alighting area 3, 5.

In the parking lot, multiple entrance rooms 3 and multiple exit rooms 5 are prepared. The entrance room 3 is connected to an outside of the parking assist system 1 via an entrance 15. An automated driving vehicle 18 enters the entrance room 3 via the entrance 15 from outside. The automated driving vehicle 18 has an automated valet parking function. The automated driving vehicle 18 is a charging target of parking fee, and is also referred to as a target vehicle in the present disclosure.

It should be noted that the automated driving vehicle 18 only needs to be able to perform the automated valet parking function in the parking lot, and does not need to have an automated driving function outside the parking lot. Further, the automated valet parking function includes a function of traveling from the entrance room 3 to a target parking position of the parking area 7 and parking by automated driving. The automated valet parking function also includes a function of traveling from the parking position of the parking area 7 to the exit room 5. When the automated valet parking function is implemented, the automated driving vehicle 18 moves between the boarding or alighting area 3, 5 and the parking area 7 in the parking lot under a state where an occupant is not in the automated driving vehicle.

The automated valet parking function includes repeatedly acquiring position information of the automated driving vehicle 18, transmitting acquired position information to a management device 39, receiving a guidance route from the management device 39, and controlling the automated driving vehicle 18 to travel along the received guidance route. The automated driving vehicle 18, which is the target vehicle to be guided, performs the automated driving and is guided along the guidance route from the current position of the automated driving vehicle 18 to a target position, such as the parking position or the exit room 5. The position information of the automated driving vehicle 18 indicates an estimation result of the current position of the automated driving vehicle 18, and includes, for example, coordinates within an area of the parking lot as the current position.

The entrance room 3 and the exit room 5 may be adjacent to an entrance 23 of a facility 22, such as a store. An occupant of the automated driving vehicle 18, who has entered the entrance room 3, gets off the automated driving vehicle 18. Then, the occupant can walk to the facility entrance 23.

The exit room 5 is connected to the outside area of the parking assist system 1 through an exit 27. The automated driving vehicle 18 can go through the exit 27 from the exit room 5, and proceeds to the outside of the parking assist system 1. The exit room 5 is adjacent to the facility entrance 23. The occupant can walk from the facility entrance 23 to the exit room 5.

The parking area 7 includes multiple parking spaces or parking positions for parking multiple automated driving vehicles 18. Multiple sections for parking multiple vehicles are defined in the parking area 7. Multiple sections for temporarily parking multiple vehicles are defined in the entrance room 3 and the exit room 5. Each section of the entrance room 3, the exit room 5, and the parking area 7 is a space where one automated driving vehicle 18 can be parked. In one example, the parking area 7 may be not divided into sections.

The automated driving vehicle 18 can automatically travel from the entrance room 3 to the parking area 7. The automated driving vehicle 18 can automatically travel from the parking area 7 to the exit room 5.

As shown in FIG. 2, the parking assist system 1 includes the management device 39, an infrastructure 41, a terminal device 43, and a reservation device 45.

The management device 39 corresponds to the parking charge device of the present disclosure. The management device 39 includes a control unit 47 and a communication unit 49. The control unit 47 includes a microcomputer having a CPU 51 and a semiconductor memory (hereinafter referred to as a memory 53) such as a RAM or a ROM, for example.

Each function of the control unit 47 is implemented by executing a program stored in a non-transitory tangible storage medium by the CPU 51. In this example, the memory 53 corresponds to a non-transitory tangible storage medium in which the program is stored. A method corresponding to the program is performed when the program is executed. The control unit 47 may include one or more microcomputers.

The control unit 47 transmits, to the automated driving vehicle 18, a guidance route to the parking position and a parking start instruction. As shown in FIG. 3, the control unit 47 includes a count start unit 47A, a count termination unit 47B, a parking fee calculation unit 47C, a parking fee determination unit 47D, a temporary calculation unit 47E, and a movement request unit 47F. The functional blocks 47A to 47F of the control unit 47 will be described later.

The memory 53 stores map information of the parking lot. The map information includes information indicating a state of each section included in the parking area 7. The state of each section may be an available state where the parking section is vacant (hereinafter referred to as a vacant state) and an unavailable state where the parking section is occupied by the automated driving vehicle 18 (hereinafter referred to as an occupied state). The communication unit 49 is configured to communicate with the automated driving vehicle 18.

The infrastructure 41 acquires information representing a state inside the parking lot (hereinafter referred to as parking lot information), and provides the acquired parking lot information to the management device 39. The infrastructure 41 includes an exterior sensor for measuring a size of the vehicle located in the entrance room 3, a camera for capturing an inside area of the parking lot, a lidar, or the like. The infrastructure 41 may detect a presence of the automated driving vehicle 18 at a specific location in the parking lot, or may detect a location of the automated driving vehicle 18 in the parking lot.

For example, examples of the parking lot information include information representing positions of obstacles, information representing the state of each parking section in the parking area 7, position information of the automated driving vehicles 18 positioned inside the parking assist system 1, or the like.

As shown in FIG. 1, the terminal device 43 is installed in the vicinity of the entrance room 3. The vicinity of the entrance room 3 includes the boarding or alighting area 3, 5. That is, the vicinity of the entrance room 3 includes an inside area of the entrance room 3 and a periphery of the entrance room 3, and indicates an area within which the user can immediately return to the entrance room 3 without making another user wait.

The terminal device 43 receives an operation made by the user, and outputs a signal indicating the received operation to the management device 39. The terminal device 43 is configured to communicate with the management device 39. The terminal device 43 outputs a parking request signal, for example, in response to the input operation made by the user.

The parking request signal is a signal that requests a transport of the vehicle 18 in the entrance room 3 to the parking area 7 and a parking of the vehicle 18 in the parking position. The terminal device 43 may output, to the management device 39, identification information of the automated driving vehicle 18 together with the signal, which is output in response to the input operation made by the user.

The reservation device 45 is a device carried by the user of the automated driving vehicle 18, and can make a reservation of the parking lot according to the user's operation. In the reservation, it is possible to set a scheduled entry time and a scheduled exit time. When the management device 39 receives the reservation, the management device secures a parking space for the automated driving vehicle 18 in the parking area 7. The scheduled exit time is a time when a reservation duration expires. The reservation device 45 can communicate with the management device 39. For example, the reservation device 45 may be implemented by a smart phone or the like.

As described above, the automated driving vehicle 18 has the automated valet parking function. As shown in FIG. 2, the automated driving vehicle 18 includes a control unit 69, a sensor group 71, a position information acquisition unit 73, and a communication unit 75.

The control unit 69 includes a microcomputer having a CPU and a semiconductor memory such as a RAM or a ROM, for example. The control unit 69 controls an operation of the automated driving vehicle 18. The automated driving function is implemented by the control operation executed by the control unit 69. The automated driving vehicle 18 acquires, from the management device 39, the map information of the parking lot and the guidance route. When performing the automated driving, the automated driving vehicle 18 uses the acquired map information and the guidance route.

The sensor group 71 is configured to acquire peripheral information indicating a situation around the automated driving vehicle 18. The contents of the peripheral information may include a position of an obstacle existing around the automated driving vehicle 18. The sensor group 71 includes, for example, a camera, a lidar, and the like. The automated driving vehicle 18 uses the peripheral information when performing the automated driving.

The position information acquisition unit 73 acquires the position information of the automated driving vehicle 18. The position information acquisition unit 73 is, for example, a position estimation system that uses a lidar and a map. The automated driving vehicle 18 uses the position information when performing the automated driving. The communication unit 75 can communicate with the management device 39.

(1-2. Process)

The following will describe an operation of automated valet parking, which is a premise of charging process for the parking fee executed by the management device 39. The charging process for the parking fee will be described in sub-section 1-2-7.

(1-2-1. Parking Setting Process Executed by Management Device 39)

Figure 4:
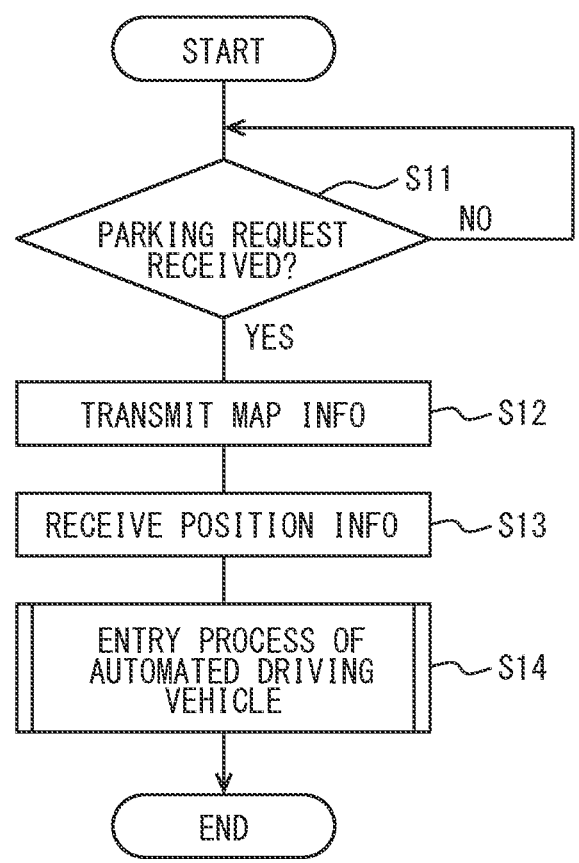
FIG. 4 is a flowchart illustrating a parking setting process executed by the management device.

The following will describe the parking setting process executed by the management device 39 with reference to FIG. 4. The parking setting process may be configured to start in response to a power of the management device 39 being turned on. After start of the parking setting process, the process is repeatedly executed. Hereinafter, a process executed by the control unit 47 (particularly executed by the CPU 51) of the management device 39 is also referred to as a process executed by the management device 39.

In S11 of the parking setting process shown in FIG. 4, the management device 39 determines whether a parking request signal is received.

When a user such as an occupant of the automated driving vehicle 18 inputs a parking request by operating the terminal device 43, the terminal device 43 transmits a parking request signal corresponding to the user's input operation to the management device 39. At this time, the user inputs vehicle information such as a number plate for specifying a vehicle, user information such as a user ID and a password for specifying the user, and other necessary types of information, to the terminal device 43. After inputting the parking request, the user can leave the parking lot and head for a destination.

Subsequently, the management device 39 transmits the map information of the parking lot to the automated driving vehicle 18 in S12. That is, when the user inputs, to the terminal device 43, the parking request to start the parking, the management device 39 transmits the map information of the parking lot to the automated driving vehicle 18. Even when receiving an exit request after the parking request and before the parking is completed, the management device 39 transmits the map information of the parking lot to the automated driving vehicle 18. The exit request will be described later.

The automated driving vehicle 18 that has received the map information is required to return the position information. Thus, the management device 39 receives the position information transmitted from the automated driving vehicle 18 in S13. The process proceeds to S14, and the control unit 47 performs an entry process of the automated driving vehicle 18. The entry process is executed to move the automated driving vehicle 18 to the parking position. When the entry process of the automated driving vehicle ends, the management device 39 ends the parking setting process.

(1-2-2. Entry Process of Automatic Driving Vehicle)

Figure 5:
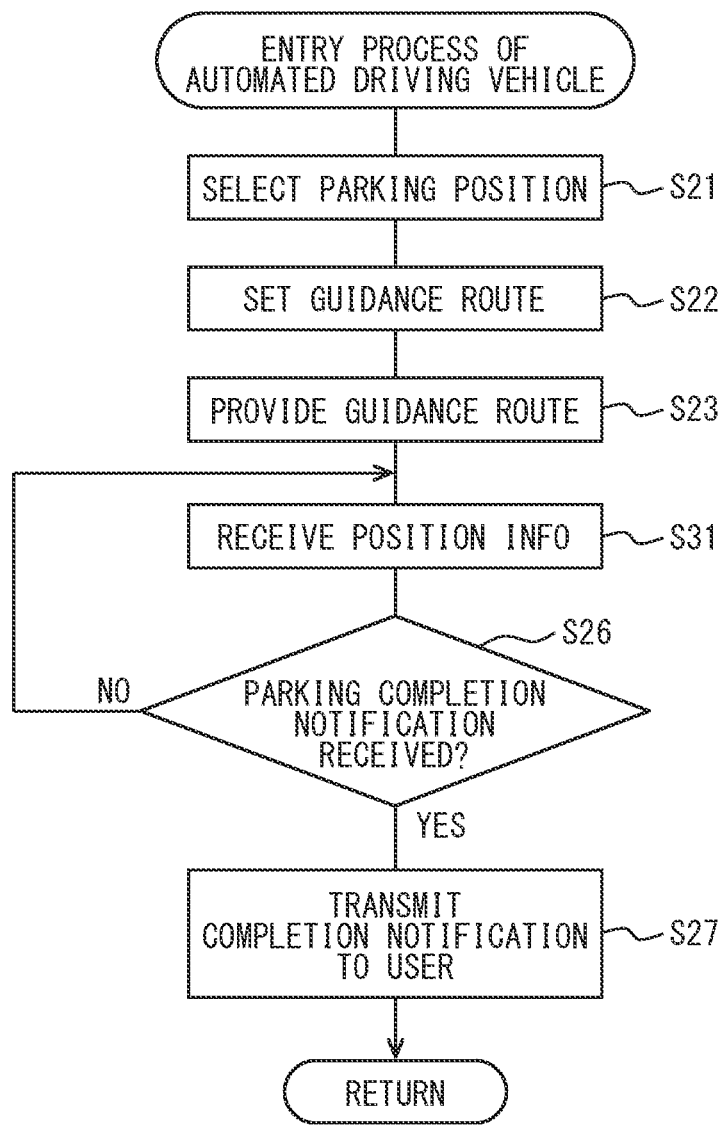
FIG. 5 is a flowchart illustrating an entrance exit process of automated driving vehicle included in the parking setting process.

The following will describe the entry process of the automated driving vehicle 18 executed by the management device 39 with reference to FIG. 5. In S21 of the entry process of the automated driving vehicle, the management device 39 selects the parking position, which is a destination position (that is, end point) of the guidance route.

In the parking area 7, a vacant parking section may be selected as the parking position. For example, the management device 39 may determine the state of each section as follows. When the automated driving vehicle 18 parks in a certain section, the automated driving vehicle 18 transmits identification information of the section and parking start information to the management device 39. When the automated driving vehicle 18 leaves the parking section in which the vehicle has been parked, the automated driving vehicle 18 transmits the identification information of the parking section and parking completion information to the management device 39.

The management device 39 determines the state of each parking section based on the history of information transmitted from the automated driving vehicle 18. Further, the management device 39 may determine the state of each parking section based on the information supplied by the infrastructure 41.

When there is only one vacant parking section, the management device 39 sets the vacant parking section as the parking position. When there are multiple vacant parking sections, the management 39 selects one section as the parking position from the multiple vacant parking sections based on a predetermined criterion. Examples of the criteria include selecting the parking section closest to the entrance room 3, selecting the parking section closest to the exit room 5, and selecting the parking section in an area that includes relatively large number of vacant parking sections.

In S22, the management device 39 sets the guidance route using the map information of the parking lot. The management device 39 sets the guidance route so that the automated driving vehicle 18 can perform the automated driving. The management device 39 sets, as the guidance route, a route from the current position of the automated driving vehicle 18, that is, an initial entry position of the automated driving vehicle 18 to the parking position selected in S21. The initial entry position of the automated driving vehicle 18 is a position before the automated driving vehicle 18 starts to move toward the parking position selected in S21. In S23, the management device 39 transmits, to the automated driving vehicle 18, information representing the guidance route set in S22 (hereinafter referred to as guidance route information) using the communication unit 49.

The guidance route information transmitted in S23 may also function as an instruction to start parking of the automated driving vehicle 18. The automated driving vehicle 18 receives the guidance route information, and starts the automated driving along the set guidance route. Details of this process will be described later.

In S31, the management device 39 acquires the position information of the automated driving vehicle 18. In S26, the process determines whether the communication unit 49 has received a parking completion notification. The parking completion notification is a notification transmitted by the automated driving vehicle 18 when the automated driving vehicle 18 completes parking at the target parking position.

In response to no reception of the parking completion notification, the process returns to S31. In response to reception of the parking completion notification, the management device 39 transmits, to a user, a completion notification in S27. For example, the management device 39 transmits the completion notification to a portable terminal device carried by the user. In the present embodiment, the portable terminal device carried by the user corresponds to the reservation device 45. The completion notification transmitted to the user is a notification indicating that a parking related work of the automated driving vehicle 18, such as entry to or exit from the parking position is completed. The process shown in FIG. 4 is ended after S27 is executed.

(1-2-3. Automatic Parking Process Executed by Automatic Driving Vehicle 18)

Figure 6:
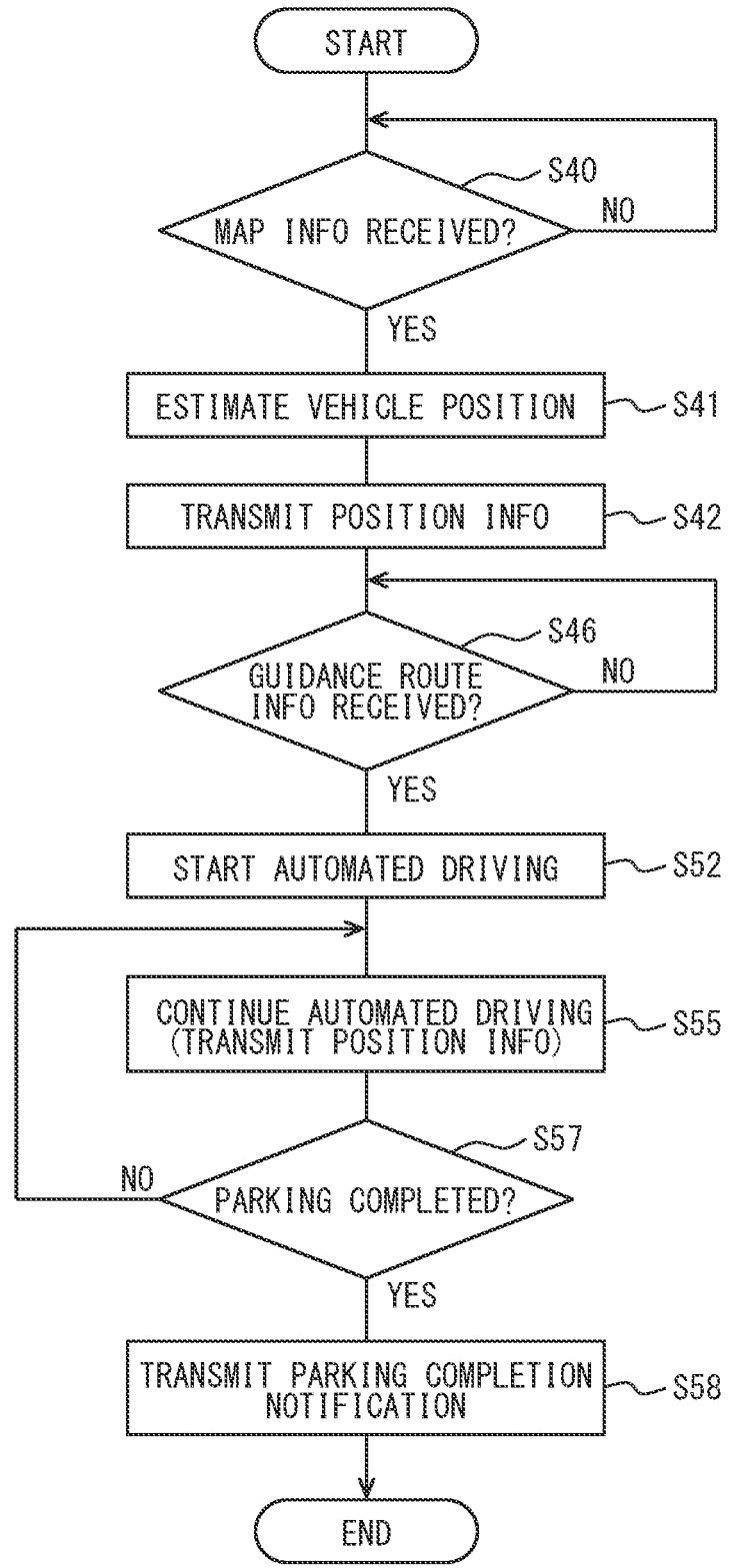
FIG. 6 is a flowchart illustrating an automated parking process executed by the automated driving vehicle.

The following will describe an automated parking process executed by the automated driving vehicle 18 with reference to FIG. 6. The automated parking process is a process in which the automated driving vehicle 18 automatically moves from the entrance room 3 to the parking position corresponding to the entry process of the automated driving vehicle executed by the management device 39.

In S40, the control unit 69 of the automated driving vehicle 18 determines whether the communication unit 75 has received the map information of the parking lot. When the map information is not received, the process repeats S40.

When the map information is received, the process proceeds to S41, and the control unit 69 estimates, in S41, the current position of the automated driving vehicle 18. Then, in S42, the control unit 69 transmits the estimation result of the current position to the management device 39 as the position information of the automated driving vehicle 18.

In S46, the control unit 69 determines whether the guidance route information is received. The guidance route information is transmitted from the management device 39. In S46, when the guidance route information is determined to be not received, the process repeats S46.

In S46, when the guidance route information is received, the control unit 69 starts the automated driving of the automated driving vehicle 18 in S52. When performing the automated driving, the control unit 69 drives the automated driving vehicle 18 according to the guidance route indicated by the guidance route information.

The control unit 69 continues the automated driving of the automated driving vehicle 18 in S55. At this time, the control unit 69 repeatedly transmits the latest position information of the automated driving vehicle 18 to the management device 39 until the parking of the automated driving vehicle is determined to be completed in S57. The position information transmitted from the automated driving vehicle is received by the management device 39.

The control unit 69 determines, in S57, whether the parking is completed. The completion of parking is determined when the automated driving vehicle 18 arrives at and is parked in the parking position set by the management device 39. When the parking position is set to the target position and then the target position is changed, the control unit 69 also determines that parking is completed even when the automated driving vehicle 18 arrives at the new target position after change. When the parking is not completed, the process returns to S55.

In S57, when determining that the parking is completed, the process proceeds to S58, and the control unit 69 transmits the parking completion notification using the communication unit 75. Then, the process shown in FIG. 6 is ended. The management device 39 receives the parking completion notification transmitted from the automated driving vehicle.

(1-2-4. Exit Setting Process Executed by Management Device 39)

Figure 7:
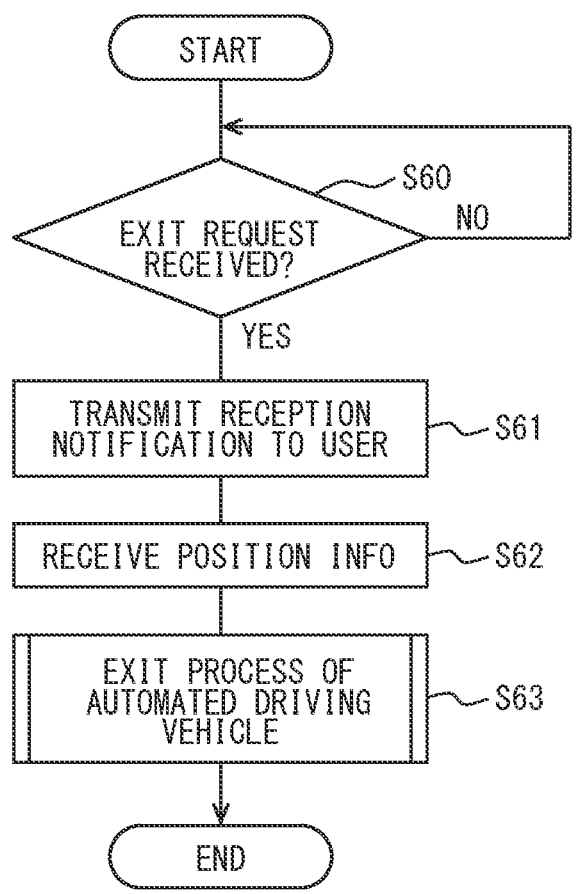
FIG. 7 is a flowchart illustrating an exit setting process executed by the management device.

The following will describe an exit setting process executed by the management device 39 with reference to FIG. 7. The exit setting process is a process for moving the automated driving vehicle 18 from the parking position to the exit room 5 using the automated driving function of the automated driving vehicle 18. Hereinafter, a process executed by the control unit 47 (particularly executed by the CPU 51) of the management device 39 is also referred to as a process executed by the management device 39.

The exit setting process is a process that the management device 39 repeatedly executes, for example, in parallel with other processes. In the exit setting process, first, in S60, the management device 39 determines whether an exit request signal is received. The exit request signal is transmitted from the terminal device 43.

When determining that the exit request signal is not received in S60, the process repeats S60. When receiving the exit request signal, the management device 39 transmits, in S61, a reception notification, which indicates a reception of exit request of the automated driving vehicle 18, to the portable terminal device carried by the user.

The management device 39 receives the position information transmitted from the automated driving vehicle 18 in S62. In S63, the management device 39 executes an exit process of automated driving vehicle. The exit process is executed to move the automated driving vehicle 18 to the exit room 5. After completing the exit process of automated driving vehicle, the management device 39 ends the exit setting process shown in FIG. 7.

(1-2-5. Exit Process of Automatic Driving Vehicle)

Figure 8:
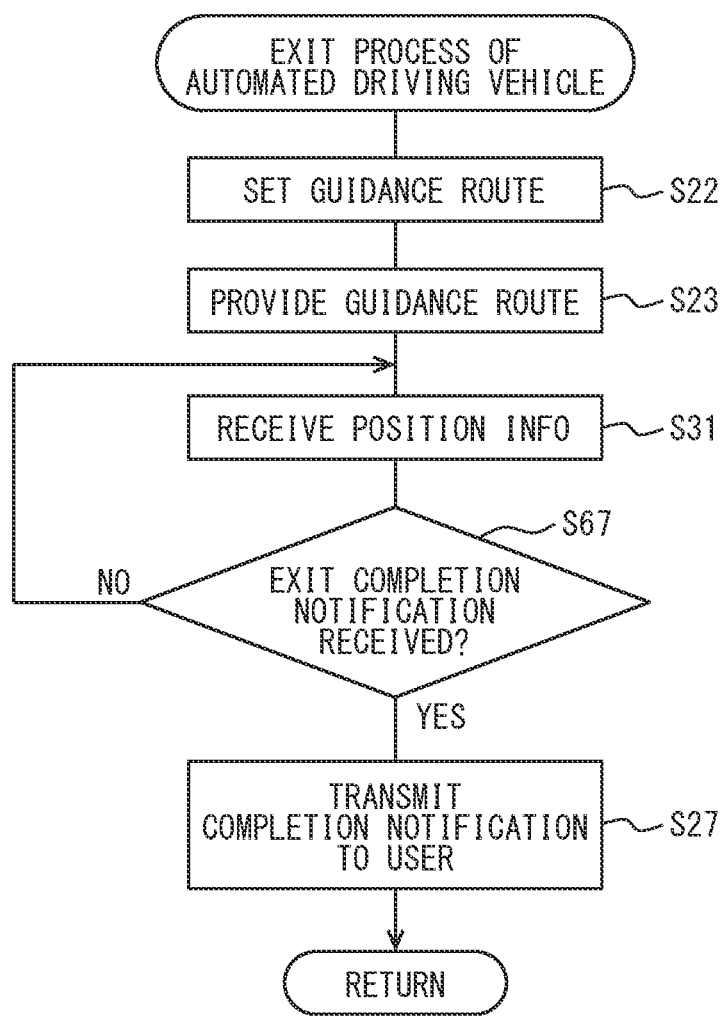
FIG. 8 is a flowchart illustrating an exit process of the automated driving vehicle included in the exit setting process.

The following will describe an exit process of automated driving vehicle executed by the management device 39 with reference to FIG. 8. In the exit process of automated driving vehicle, as shown in FIG. 8, the management device executes S22 and S23 included in the above-described entry process of automated driving vehicle shown in FIG. 5.

After S23, the management device 39 executes the above-described process executed in S31. In S67, the management device 39 determines whether an exit completion notification is received. The exit completion notification is transmitted from the automated driving vehicle 18 to the management device 39 when the automated driving vehicle 18 arrives at the exit room 5, which is set as the target position of the guidance route.

The exit completion notification is a notification transmitted by the automated driving vehicle 18 when the automated driving vehicle 18 completes parking at the target position, which is set as an end point of the guidance route. When the exit completion notification is not received, the process returns to S31. When the exit completion notification is received, the process proceeds to S27, and then ends. In S27, the management device transmits the completion notification to the user as described above.

(1-2-6. Automatic Exit Process Executed by Automatic Driving Vehicle 18)

Figure 9:
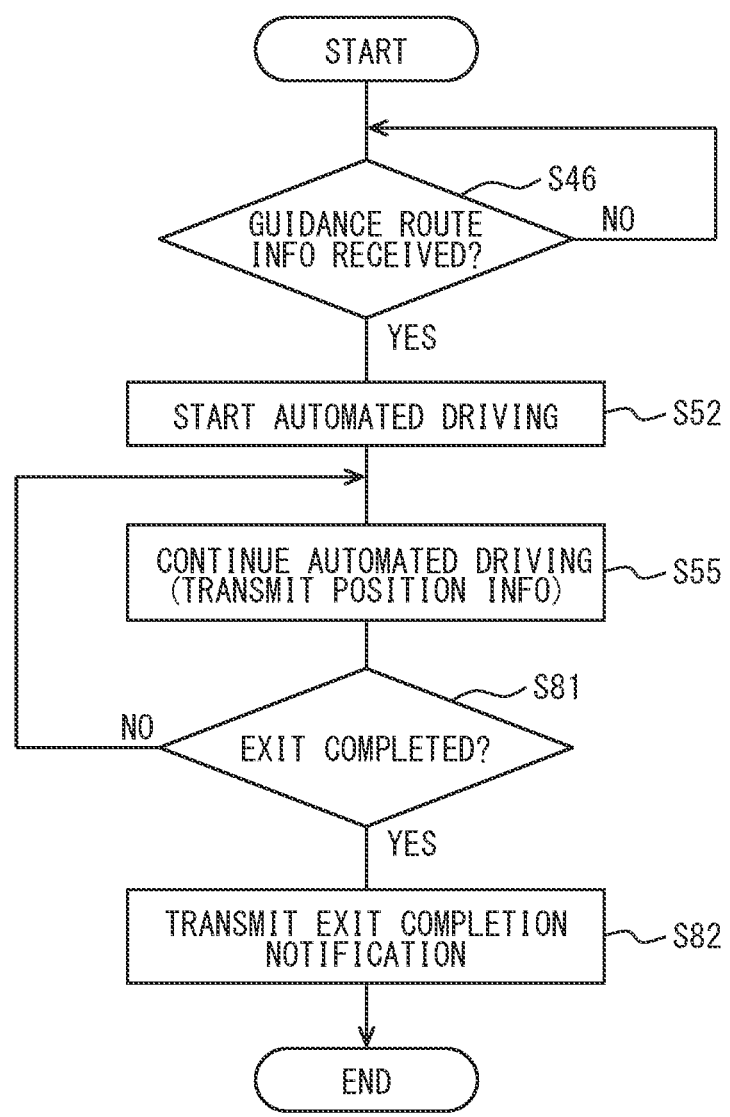
FIG. 9 is a flowchart illustrating an automated exit process executed by the automated driving vehicle.

The following will describe an automated exit process executed by the automated driving vehicle 18 with reference to FIG. 9. The automated exit process is a process for moving the automated driving vehicle 18 from the parking position to the exit room 5 corresponding to the exit process of automated driving vehicle executed by the management device 39.

In the automated exit process, as shown in FIG. 9, the control unit 69 executes S46, S52, and S55 included in the above-described automated parking process shown in FIG. 6. After S55, the control unit 69 determines, in S81, whether the exit of automated driving vehicle is completed. When determining that the automated driving vehicle 18 arrives at the exit room 5, which is the target position, the control unit 69 determines that the exit of automated driving vehicle is completed.

When the exit is not completed, the process returns to S55. When the exit is determined to be completed in S81, the control unit 69 transmits the exit completion notification to the management device 39 in S82, and ends the automated exit process.

(1-2-7. Charging Count Start Process Executed by Management Device 39)

Figure 10:
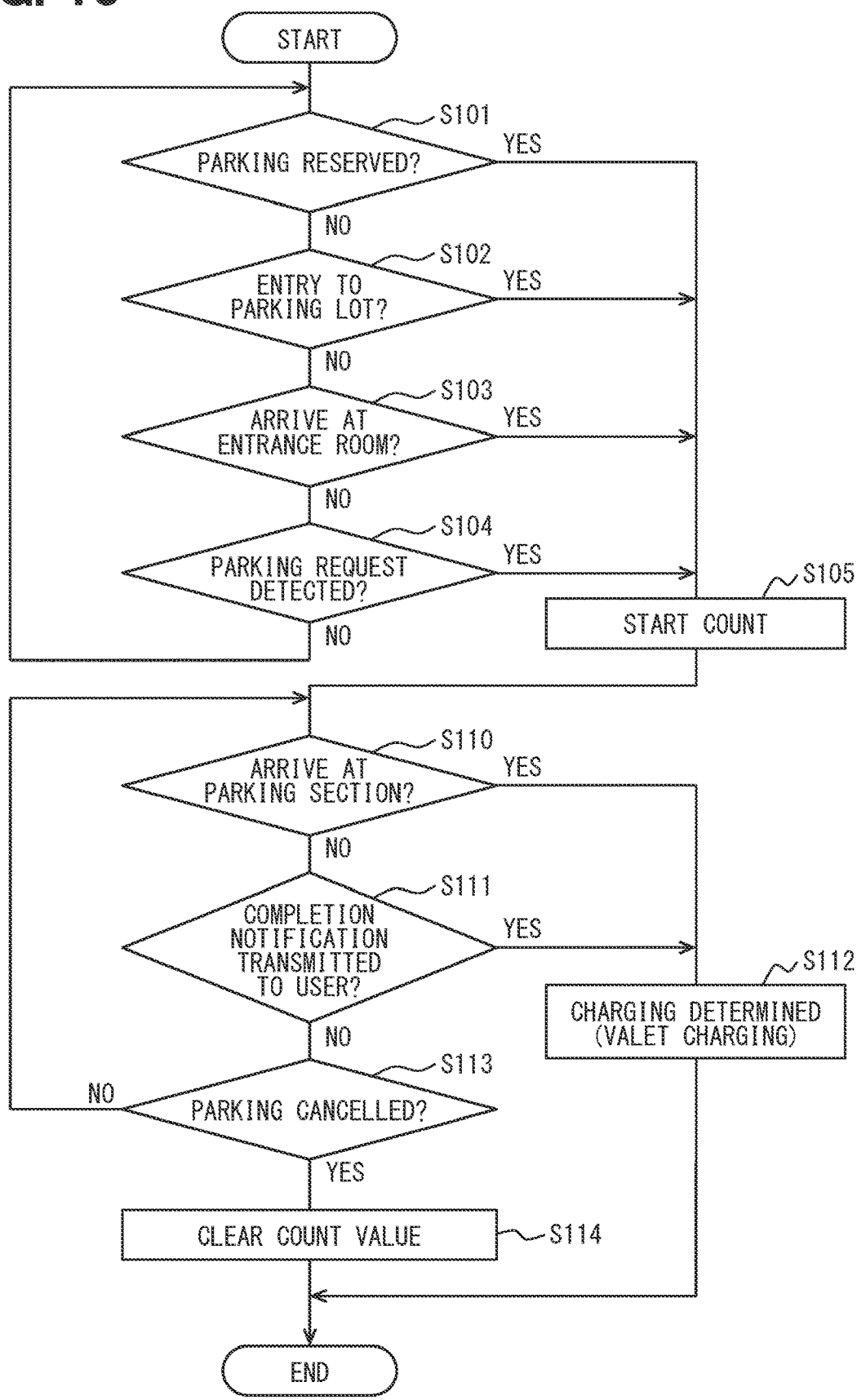
FIG. 10 is a flowchart illustrating a charging count start process executed by the management device.

The following will describe a charging count start process executed by the management device 39 with reference to the flowchart shown in FIG. 10. The management device executes the charging count start process for individual automated driving vehicle 18 in parallel with the above-described process. The charging count start process is a process for starting charging counting at any time during execution of the above-described process. The charging here represents charging for the parking fee when the vehicle is parked in the parking lot. The charging count start process and a charging count termination process, which will be described later, correspond to the parking duration management method of the present disclosure. In the charging count start process and charging count termination process, a parking duration for parking fee charging is counted, and the parking fee is calculated based on the parking duration. The parking duration management method corresponds to a method of calculating the parking duration.

In S101 of the charging count start process, the management device 39 determines whether parking of the automated driving vehicle 18 in the parking lot is reserved. The reservation for parking the automated driving vehicle 18 is made by the user using the reservation device 45. In S101, the management device may determine that the parking reservation is made when the current time becomes equal to or after the scheduled entrance time instead of the time when the parking reservation is made. The management device 39 compares the current time with the scheduled entry time, and starts to count the parking duration when the scheduled entry time is reached.

When the management device 39 determines in S101 that no parking reservation for the automated driving vehicle 18 is made in the parking lot, the management device 39 proceeds to S102 and determines whether the automated driving vehicle 18 has entered the parking lot. For example, the management device may determine whether the automated driving vehicle 18 has passed the entrance 15 of the parking lot.

For example, the management device 39 determines whether the automated driving vehicle 18 has entered the parking lot based on information transmitted from the infrastructure 41, for example, the position information of the automated driving vehicle 18 detected by the infrastructure 41. Alternatively, the management device 39 may determine whether the automated driving vehicle 18 has entered the parking lot based on the position information of the automated driving vehicle 18 transmitted from the automated driving vehicle 18 to the management device 39.

In S102, when the management device 39 determines that the automated driving vehicle 18 has not entered the parking lot, the process proceeds to S103. In S103, the management device 39 determines whether the automated driving vehicle 18 arrives at the entrance room 3 before the automated driving vehicle 18 moves to the parking area 7, that is, before the parking operation of the automated driving vehicle 18. For example, the management device 39 may determine whether the automated driving vehicle 18 arrives at the entrance room 3 based on the information transmitted from the infrastructure 41. As another example, the management device 39 may determine whether the automated driving vehicle 18 arrives at the entrance room 3 based on the position information of the automated driving vehicle 18, which is transmitted from the automated driving vehicle 18 to the management device 39.

When the management device 39 determines that the automated driving vehicle 18 arrives at the entrance room 3 in S103, the process proceeds to S104. In S104, the management device determines whether a parking request is detected. In S104, when the parking request is determined to be detected, the management device 39 proceeds to S105. In S105, the count start unit 47A starts counting of parking duration for charging the parking fee. In a state where the counting of parking duration has been started, the counting is continued.

When the management device 39 determines that (i) parking reservation for the automated driving vehicle 18 is made in the parking lot in S101, (ii) the automated driving vehicle 18 enters the parking lot in S102, or (iii) the automated driving vehicle 18 arrives at the entrance room 3 before moving to the parking area 7 in S103, the process proceeds to S105.

The count start unit 47A starts counting of parking duration for charging the parking fee in S105 when the start condition shown in one of S101, S203, S103 or S104 is satisfied. For example, when one of S101, S102, or S103 is set as the start condition, the count start unit 47A starts counting of the parking duration before the parking request is detected.

For example, the process shown in S101 may be omitted. In another example, the start condition may be set as only one of S102, S103, or S104, and other processes may be omitted. In another example, when the process shown in S102 and S103 is omitted, the process may proceed to S104 when a negative determination is made in S101.

When the management device 39 determines, in S104, that no parking request is detected, the process returns to S101. After S105, the management device 39 determines whether the parking of the automated driving vehicle 18 is completed. In the present embodiment, the management device determines whether the parking is completed by executing S110 and S111. As another example, only S110 or only S111 may be executed to determine the completion of parking.

The management device 39 proceeds to S110 and determines whether the automated driving vehicle 18 has arrived at the parking section of the parking area 7. For example, the management device 39 may determine whether the automated driving vehicle 18 arrives at the parking section based on the information transmitted from the infrastructure 41. As another example, the management device 39 may determine whether the automated driving vehicle 18 arrives at the parking section based on the position information of the automated driving vehicle 18, which is transmitted from the automated driving vehicle 18 to the management device 39. When the management device 39 determines that the automated driving vehicle 18 arrives at the parking section of the parking area 7 in S110, the process proceeds to S111. In S111, the management device determines whether a completion notification is transmitted to the user.

When the management device 39 determines, in S110, that the automated driving vehicle 18 arrives at the parking section of the parking area 7 and determines, in S111, that the completion notification is transmitted to the user, the process proceeds to S112. In S112, the parking fee determination unit 47D determines the automated driving vehicle 18 as the charging target of parking fee. At this time, a separate service fee for automated valet parking, for example, a fixed basic service fee for automated valet parking may be set separate from the parking fee calculated corresponding to the parking duration. In S112, the automated driving vehicle 18 is determined as the charging target, but the specific parking fee to be charged is not determined. The parking fee to be charged is calculated corresponding to the parking duration in a charging count termination process, which will be described later. After S112, the charging count start process shown in FIG. 10 is ended.

Figure 11:
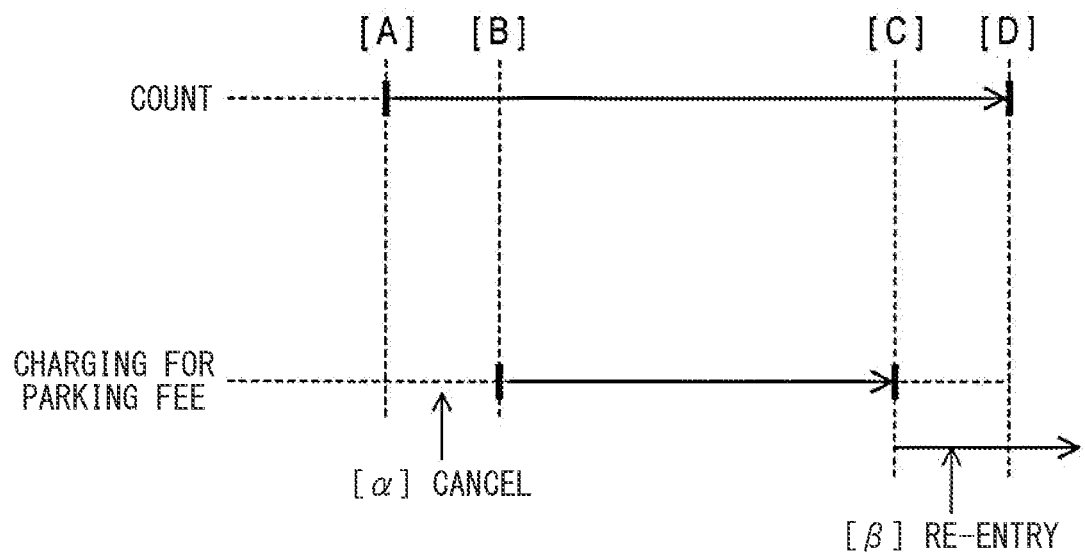
FIG. 11 is a timing chart illustrating charging count and charge timing.

In the present embodiment, as shown in FIG. 11, counting start in S105 indicated by [A] and the determination of charging target in S112 indicated by [B] are set at different time points. With this configuration, as shown in FIG. 11, after counting start at time point [A] and before determination of charging target at time point [B], cancellation of parking indicated by [α] can be simply made by the user. In the present embodiment, only when the counting for parking fee charge is started and the charging target is determined, the calculation for charging the parking fee is executed in the charging count termination process.

When a first condition for the automated driving vehicle 18 is satisfied, the management device 39 starts counting of parking duration for the automated driving vehicle 18. In addition, when a second condition is satisfied, the automated driving vehicle is determined as the charging target, and the parking fee will be charged when the automated driving vehicle 18 exits the parking lot. That is, after the count starts when the first condition is satisfied, the parking fee is not charged for a duration until the second condition is satisfied. For example, the first condition is set as one of (i) parking reservation of the automated driving vehicle 18 in the parking lot, (ii) entrance of the automated driving vehicle 18 into the parking lot, (iii) arrival of the automated driving vehicle 18 in the entrance room 3, or (iv) detection of the parking request. For example, the second condition is set as one of (i) arrival of the automated driving vehicle 18 at the parking section of the parking area 7, or (ii) transmission of the completion notification to the user.

The management device executes the charging count start process for individual automated driving vehicle 18. When the first condition is satisfied, the management device 39 starts a timer (not shown) included in the management device 39 for the corresponding automated driving vehicle 18. Alternatively, the management device 39 may record the time when the first condition is satisfied in the memory 53 or the like, and further record whether the second condition is satisfied or not in the memory 53 or the like.

As another example, the start of counting in S105 indicated by [A] and the determination of charge in S112 indicated by [B] may be set at the same time. In this case, when an affirmative determination is made in any one of S101, S102, S103, S104, S110, or S111, the process in S105 and S112 may be executed.

When the management device 39 determines in S111 that the completion notification is not transmitted to the user, the management device 39 proceeds to S113 and determines whether parking is canceled. The cancellation of parking indicates that the parking of automated driving vehicle 18 is stopped before completion of parking.

When the user inputs an instruction into the terminal device 43 or the reservation device 45 to cancel the parking of the automated driving vehicle 18, the parking is cancelled. Alternatively, when the management device 39 checks the automated driving vehicle 18 and the check result indicates that the parking of automated driving vehicle 18 is unavailable, the parking is cancelled.

In a case where the parking is cancelled before the completion of parking, the automated driving vehicle 18 is maintained in the entrance room 3 when the automated driving vehicle 18 is located in the entrance room 3. In a case where the parking is cancelled before the completion of parking, the automated driving vehicle 18 is moved to the exit room 5 when the automated driving vehicle is moving toward the parking section of parking area after leaving the entrance room 3. When the management device determines in S113 that parking is not canceled, the process returns to S110.

When the management device 39 determines in S113 that the parking is canceled, the process proceeds to S114, and the count termination unit 47B clears the counting result for charging the parking fee. In this case, since the charging is not determined, the parking fee is not charged from the user even though the counting has started. After S114, the charging count start process shown in FIG. 10 is ended.

The management device 39 starts the counting in S105 and makes the charging determination in S112. For example, the management device can record the duration from the arrival of automated driving vehicle 18 at entrance room 3 to the arrival of automated driving vehicle 18 at the parking section. The management device can also record the cancellation frequency of valet parking before the completion of parking in the parking section. As a result, the management device 39 can manage the parking lot more efficiently.

(1-2-8. Charging Count Termination Process Executed by Management Device 39)

Figure 12:
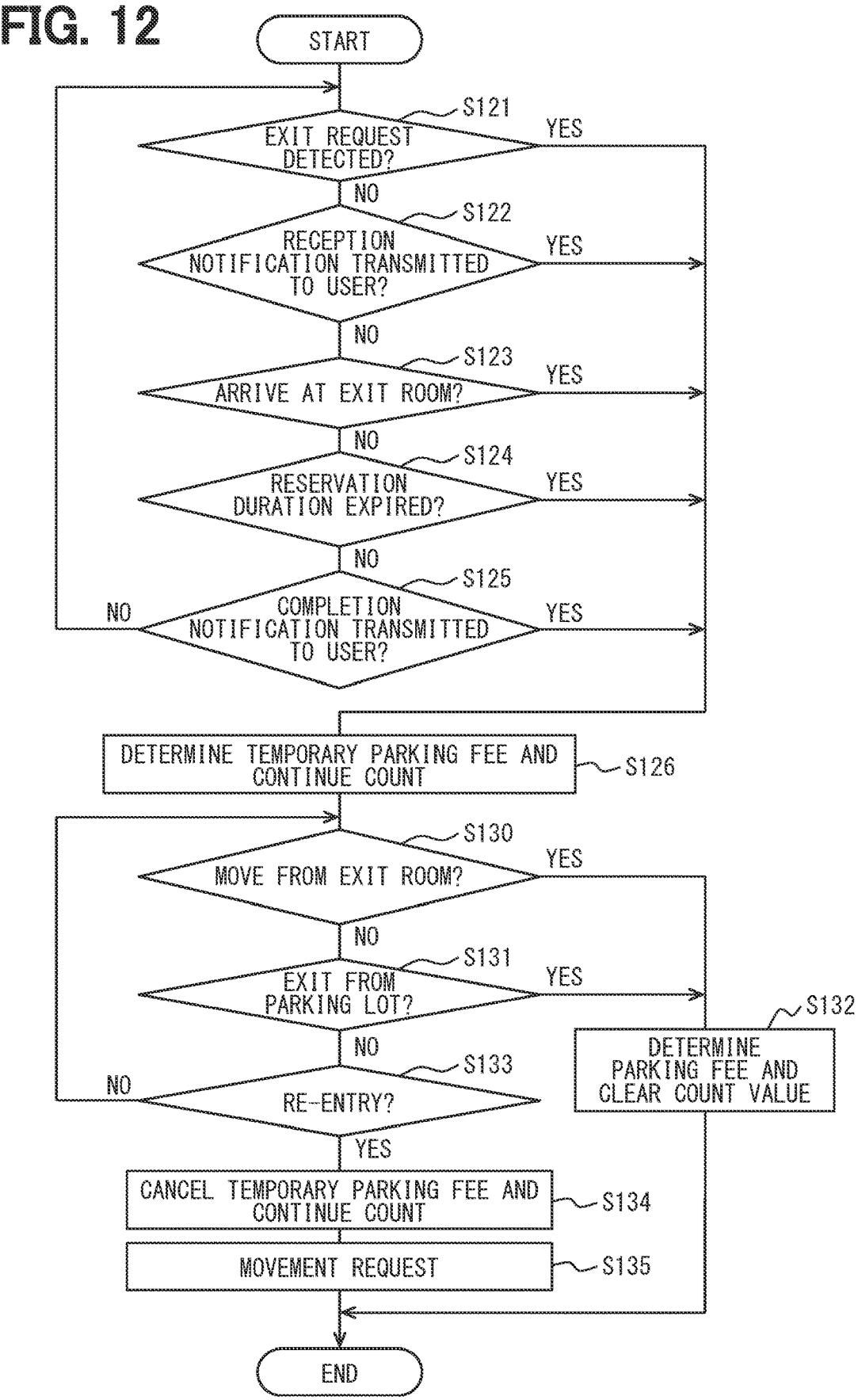
FIG. 12 is a flowchart illustrating a charging count termination process executed by the management device.

The following will describe a charging count termination process executed by the management device 39 with reference to the flowchart shown in FIG. 12. The management device may start the charging count termination process when the charging determination is made.

In the charging count termination process, first, in S121, the management device 39 determines whether an exit request is detected. When the management device 39 determines in S121 that the exit request is not detected, the process proceeds to S122 and determines whether the reception notification (that is, the reception notification in S61 of FIG. 7) is transmitted to the user.

When the management device 39 determines in S122 that the reception notification is not transmitted to the user, the management device 39 proceeds to S123 and determines whether the automated driving vehicle 18 is arrived at the exit room 5.

For example, the management device 39 may determine whether the automated driving vehicle 18 arrives at the exit room 5 by determining whether the exit completion notification is transmitted from the automated driving vehicle 18. As another example, the management device 39 may determine whether the automated driving vehicle 18 arrives at the exit room 5 based on the information transmitted from the infrastructure 41. As another example, the management device 39 may determine whether the automated driving vehicle 18 arrives at the exit room 5 based on the position information of the automated driving vehicle 18, which is transmitted from the automated driving vehicle 18 to the management device 39.

When the management device 39 determines that the automated driving vehicle 18 arrives at the exit room 5 in S123, the process proceeds to S124. In S124, the management device 39 determines whether a pre-set reservation duration has expired. When the management device 39 determines that the pre-set reservation duration has expired in S124, the process proceeds to S125. In S125, the management device 39 determines whether the completion notification is transmitted to the user.

When the management device 39 determines, in S125, that the completion notification is not transmitted to the user, the process returns to S121. When the management device 39 determines, in S125, that the completion notification is transmitted to the user, the process proceeds to S126. In S126, the temporary calculation unit 47E determines a temporary parking fee to be charged. Temporary parking fee indicates the parking fee temporarily calculated based on the counted parking duration in S126. In FIG. 11, the calculation time point of temporary parking fee is indicated by [C].

For example, the temporary parking fee may be calculated based on the counted duration (for example, elapsed time) from the time point of charging determination in S112 to the time point of temporary parking fee determination in S126. Alternatively, in S126, only the counted duration from any one of S121, S122, S123, S124, or S125 to S126 is recorded, and the parking fee may be calculated in S132.

In S126, the management device 39 may notify the portable terminal device carried by the user of the temporary parking fee. FIG. 13 is a display example displayed on a screen of the portable terminal device carried by the user when the temporary parking fee is calculated. The display example shown in FIG. 13 includes the message indicating calculation of temporary parking fee and the specific amount of temporary parking fee.

At this time, the temporary calculation unit 47E may temporarily stop the increase of parking fee to be charged, but may continue the counting of duration for charging the parking fee. The parking fee to be charged is the sum of (i) time-based fee that is calculated from the time point [A] to the time point [C] and (ii) the basic service fee for automated valet parking.

The parking fee to be charged may be the time-based fee that is calculated from the time point [B] to the time point [C], which is a duration determined as the charging target. The basic service fee for automated valet parking does not need to be added.

When the management device 39 determines in S121 that the exit request is detected or determines in S122 that the reception notification is transmitted to the user, the process proceeds to S126. When the management device 39 determines in S123 that the automated driving vehicle 18 arrives at the exit room 5 or determines in S124 that the pre-set reservation duration is expired, the process proceeds to S126.

That is, the temporary calculation unit 47E is configured to temporarily determine the parking fee when the condition for temporary calculation shown in S121 to S125 are satisfied. In another example, the temporary calculation condition may be set as only one of S121, S122, S123, S124, or S125, and other processes may be omitted. In another example, when the process shown in S121 to S124 are omitted, the process may proceed to S126 when a negative determination is made in S125.

In S130, the management device 39 determines whether the automated driving vehicle 18, which has been parked in the parking area 7, moves from the exit room 5 toward the exit 27.

For example, the management device 39 may determine whether the automated driving vehicle 18 moves from the exit room 5 toward the exit 27 based on the information transmitted from the infrastructure 41. As another example, the management device 39 may determine whether the automated driving vehicle 18 moves from the exit room 5 toward the exit 27 based on the position information of the automated driving vehicle 18, which is transmitted from the automated driving vehicle 18 to the management device 39.

When the management device 39 determines, in S130, that the automated driving vehicle 18, which has been parked in the parking area 7, does not move from the exited room 5 toward the exit 27, the process proceeds to S131. In S131, the management device 39 determines whether the automated driving vehicle 18 has exited the parking lot, that is, whether the automated driving vehicle 18 has passed through the exit 27.

For example, the management device 39 may determine whether the automated driving vehicle 18 has exited the parking lot based on the information transmitted from the infrastructure 41. As another example, the management device 39 may determine whether the automated driving vehicle 18 has exited the parking lot based on the position information of the automated driving vehicle 18, which is transmitted from the automated driving vehicle 18 to the management device 39.

When the management device 39 determines, in S131, that the automated driving vehicle 18 has exited the parking lot, that is, has passed through the exit 27, the process proceeds to S132 and determines the parking fee to be charged. When the management device 39 determines, in S130, that the automated driving vehicle 18, which has been parked in the parking area 7, moves from the exit room 5 toward the exit 27, the process proceeds to S132. In S132, the parking fee calculation unit 47C determines the parking fee to be charged. At this time, the parking fee calculation unit 47C stops counting, and clears the counting result after determining the parking fee. In FIG. 11, the calculation time point of parking fee in S132 is indicated by [D].

One of the process shown in S130 or the process shown in S131 may be properly omitted. As another example, the temporary determination of parking fee in S126 indicated by [C] of FIG. 11 and the stop of counting in S132 indicated by [D] of FIG. 11 may be set at the same time. In this case, when an affirmative determination is made in any one of S121, S122, S123, S124, S125, S130, or S131, the process in S125 and S132 may be executed. In S132, the parking fee calculation unit 47C may determine the temporarily determined parking fee as the parking fee to be charged.

When the management device 39 determines, in S131, that the automated driving vehicle 18 has not exit the parking lot, that is, has not passed through the exit 27, the process proceeds to S133. In S133, the management device determines re-entry of the automated driving vehicle 18. For example, the management device 39 counts the duration that the automated driving vehicle 18 stays in the exit room 5 after arriving at the exit room 5, and determines re-entry of the vehicle when the counted duration is equal to or longer than a preset allowable duration. Re-entry refers to an action of returning the automated driving vehicle 18 to the parking area 7.

The user may instruct the re-entry by operating the terminal device 43 or the reservation device 45. For example, re-entry may occur when the user wants to change the reservation schedule and make the automated driving vehicle 18 enter the parking section again, or when the user wants to put purchased goods in the automated driving vehicle 18 during the shopping. The management device 39 is configured to allow charging of the parking fee by continuing the counting of duration in these cases without resetting the counting result.

When the management device 39 determines, in S133, that no re-entry is made, the process returns to S130. When the management device 39 determines, in S133, that the re-entry is made, the process proceeds to S134 for performing re-charging. In this case, as shown by a time point [β] of FIG. 11 at which the re-entry is determined, the count for charging the parking fee is continued, and the state in which charging for the target vehicle is determined continues from the time point [B]. In S134, the parking fee temporarily determined in S126 is cleared, that is, canceled. In S134, the management device continues the counting for charging the parking fee. When the management device determines the re-entry of vehicle in S133, the duration from S126 at which temporary parking fee is determined to S133 at which re-entry of vehicle is determined is also added to the charging target.

In the above description, the term "re-charging" indicates that the temporarily determined parking fee is discarded and the parking fee is temporarily determined again based on the continuously counted duration, which is counted by executing the charging count termination process shown in FIG. 12 again.

The counting for charging the parking fee may be restarted from zero with the time point of [C] as a starting point. In this case, the temporarily determined parking fee may be stored in the memory 53 or the like without discarding, and the temporarily determined parking fee may be added to the temporary parking fee that is newly calculated.

In S135, the movement request unit 47F outputs a movement request that requests a moving of the automated driving vehicle 18 to the parking area 7 for re-entry purpose. After S135, the charging count termination process shown in FIG. 12 is ended.

As described above, when a third condition is satisfied, the management device 39 temporarily determines the parking fee of the automated driving vehicle 18. For example, the third condition may be set as at least one of (i) detection of exit request, (ii) transmission of the reception notification to the user, (iii) arrival of the automated driving vehicle 18 at the exit room 5, (iv) expiration of preset reservation duration, or (v) transmission of completion notification to the user.

In the charging count termination process, the count value, that is, the elapsed time is calculated by the timer of the management device 39 for each automated driving vehicle 18. Alternatively, the management device 39 may record, in the memory 53, the time point at which the third condition is satisfied, and the elapsed time may be calculated based on the recorded time point. In the present embodiment, the duration from the time point at which the second condition is satisfied to the time point at which the third condition is satisfied is used to calculate the temporary parking fee.

The management device 39 determines whether a fourth condition is satisfied. For example, the fourth condition may be set as at least one of (i) moving of the automated driving vehicle 18, which has been parked in the parking area 7, from the exit room 5 to the exit 27 or (ii) exit of the automated driving vehicle 18 from the parking lot. When the fourth condition is satisfied, the management device 39 determines the parking fee and stops counting. Alternatively, when the fourth condition is satisfied, a fee determination flag may be set in a database which stores the count value in correlation to each automated driving vehicle 18.

(1-3. Effects)

The above-described embodiment provides the following effects.

(1a) According to an aspect of the present disclosure, the management device 39 charges the parking fee of the automated driving vehicle 18 within the automated valet parking lot that moves the vehicle between the boarding or alighting area 3, 5 and the parking area 7. The management device 39 includes the count start unit 47A, the count termination unit 47B, and the parking fee calculation unit 47C.

The count start unit 47A starts counting for charging the parking fee when the start condition is satisfied. The count termination unit 47B terminates the counting when the termination condition is satisfied. The parking fee calculation unit 47C calculates the parking fee corresponding to the count value.

The count start unit 47A sets, as the start condition, at least one of (i) the reservation of parking lot for the automated driving vehicle 18, (ii) entry of the automated driving vehicle 18 into the parking lot, (iii) the detection of parking request instructed by the user for automatically parking the automated driving vehicle 18 in the parking lot, (iv) arrival of the automated driving vehicle 18 at the boarding or alighting area 3, 5 before moving to the parking area 7, (v) arrival of the automated driving vehicle 18 at the parking area 7, or (vi) transmission of the parking completion notification, which indicates the arrival of the automated driving vehicle 18 to the parking area 7, to the user.

The count termination unit 47B sets, as the termination condition, at least one of (i) detection of exit request from the user to start the exit of automated driving vehicle 18 using automated driving function, (ii) arrival of the automated driving vehicle 18, which has been parked in the parking area 7, at the boarding or alighting area 3, 5, (iii) moving of the automated driving vehicle 18, which has been parked in the parking area 7, from the boarding or alighting area 3, 5, (iv) exit of the automated driving vehicle 18 from the parking lot, (v) expiration of the preset reservation duration, (vi) transmission of the exit completion notification, which indicates the arrival of the automated driving vehicle 18 at the boarding or alighting area 3, 5, to the user, (vii) transmission of the notification, which indicates reception of the exit request, to the user, or (viii) the user's boarding on the automated driving vehicle 18.

The present disclosure excludes a case where the count start unit 47A sets, as the start condition, entry of the automated driving vehicle 18 into the parking lot and the count termination unit 47B sets, as the termination condition, exit of the automated driving vehicle 18 from the parking lot.

According to the above configuration, a duration other than the duration from when the vehicle enters the parking lot to when the vehicle exits the parking lot is used to calculate the parking fee. Thus, the parking fee can be properly charged in the automated valet parking lot.

(1b) According to the present disclosure, the management device 39 further includes a parking fee determination unit 47D. The parking fee determination unit 47D determines the charging for the automated driving vehicle when a predetermined determination condition is satisfied after the parking request is detected. At this time, the parking fee calculation unit 47C calculates the parking fee corresponding to the count value after the parking fee determination unit determines the charging for the automated driving vehicle.

According to the above configuration, the specific parking fee can be calculated after the charging for the automated driving vehicle is determined.

(1c) According to the present disclosure, the count start unit 47A starts counting before or in response be the parking request being detected.

According to the above configuration, counting is started before or in response to the parking request being detected. Therefore, even though the automated driving vehicle 18 is not actually parked in the parking area 7, the reservation fee or the parking fee for occupying the boarding or alighting area 3, 5 can be charged.

(1d) According to the present disclosure, the management device 39 further includes the temporary calculation unit 47E. The temporary calculation unit 47E calculates the temporary parking fee based on the count value at the detection time of the exit request. At this time, the count termination unit 47B adopts, as the termination condition, the user boards on the automated driving 18 within a preset duration after the automated driving vehicle 18 arrives at the boarding or alighting area 3, 5. When the counting is stopped within the preset duration, the parking fee calculation unit 47C adopts the temporary parking fee as the parking fee corresponding to the count value.

According to the above configuration, when the user boards on the automated driving vehicle 18 within the preset duration, the parking fee is calculated based on the time when the exit request is made. When the user does not board on the automated driving vehicle 18 within the preset duration, additional parking fee is charged by continuing the counting.

(1e) According to the present disclosure, the management device 39 further includes the movement request unit 47F. The movement request unit 47F outputs the movement request to move the automated driving vehicle 18 to the parking area 7 when the user does not board on the automated driving vehicle 18 within the preset duration. The temporary calculation unit 47E discards the temporary parking fee when detecting the movement request, and calculates the temporary parking fee again based on the count value when the exit request is detected again.

According to the above configuration, when the user does not board on the automated driving vehicle 18 within the preset duration, the automated driving vehicle 18 can be moved to the parking area 7 as re-entry. When the automated driving vehicle 18 is moved to the parking area 7 again, the temporary parking fee is discarded and the parking fee can be calculated again based on the time when the exit request is detected again.

(1f) According to the present disclosure, when receiving the exit request again from the user, the movement request unit 47F outputs the movement request for moving the automated driving vehicle 18 to the parking area 7. The temporary calculation unit 47E discards the temporary parking fee when detecting the movement request, and calculates the temporary parking fee again based on the count value when the exit request is detected again.

According to the above configuration, when the user instructs the exit request again, the automated driving vehicle 18 can be moved to the parking area 7 as re-entry. When the automated driving vehicle 18 is moved to the parking area 7 again, the temporary parking fee is discarded and the parking fee can be calculated again based on the time when the exit request is detected again.

(1g) According to the present disclosure, when the parking request is detected, the parking fee calculation unit 47C adds the service fee for using the automated valet parking in addition to the parking fee calculated corresponding to the count value.

According to the above configuration, in a case where a parking lot without automated valet parking service is provided together with the parking lot with automated valet parking service, the service fee for using the automated valet parking service can be charged for the vehicle which actually uses the automated valet parking service.

(1h) According to the present disclosure, the communication unit 49 transmits the information indicating the guidance route for guiding the automated driving vehicle 18 from the current location to the target position using the automated driving function.

According to the above configuration, it is possible to transmit the information indicating the guidance route to the automated driving vehicle 18.

2. Other Embodiments

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

(2a) In the above embodiment, the automated driving vehicle 18 moves within the parking lot by the automated driving function. The present disclosure is not limited to this configuration. For example, the present disclosure may be applied to a configuration which includes an unmanned transport vehicle. The unmanned transport vehicle can perform automated driving, and can transport a vehicle using the automated driving function. The vehicle transported by the unmanned transport vehicle corresponds to the target vehicle in the present disclosure.

(2b) In the above embodiment, the count start unit 47A and the count termination unit 47B of the management device 39 may perform the counting as follows. For example, the control unit 47 may include a module (not shown) for time count purpose, such as a counter. The control unit may start the counter from the time when the above-described start condition is satisfied. Then, the control unit 47 acquires the counter value at the time when the termination condition is satisfied, and calculates the elapsed time. After the counter value is acquired when the termination condition is satisfied, the counter may be configured to continue the counting in preparation for re-entry of the vehicle. Alternatively, the control unit 47 may acquire and record the time when the termination condition is satisfied. As another example, the time when the start condition is satisfied is recorded and the time when the termination condition is satisfied is recorded, and the elapsed time can be acquired by calculating the difference between the time when the start condition is satisfied and the time when the termination condition is satisfied.

Figure 14:
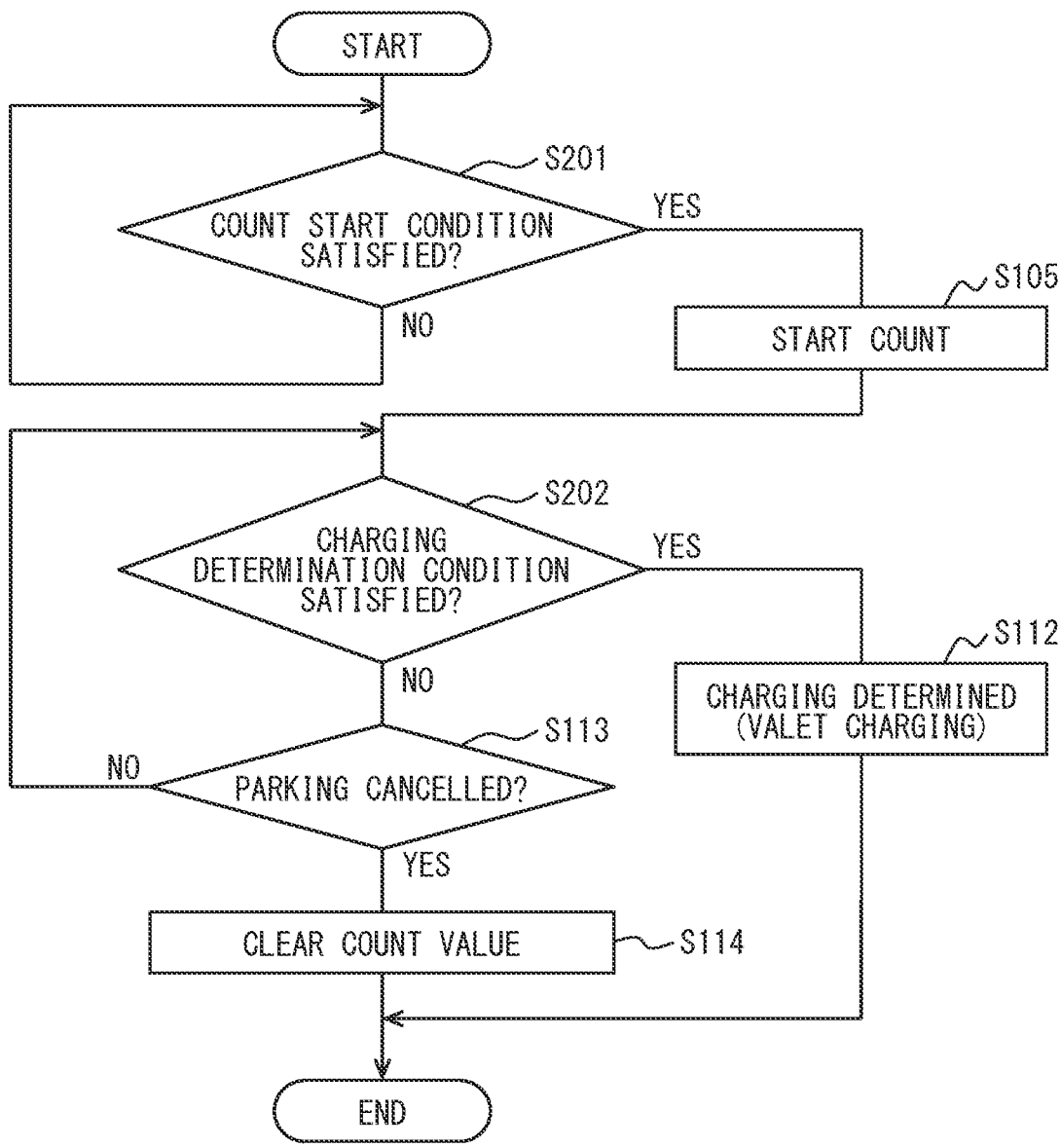
FIG. 14 is a flowchart showing a charging count start process executed by the management device.
Figure 15:
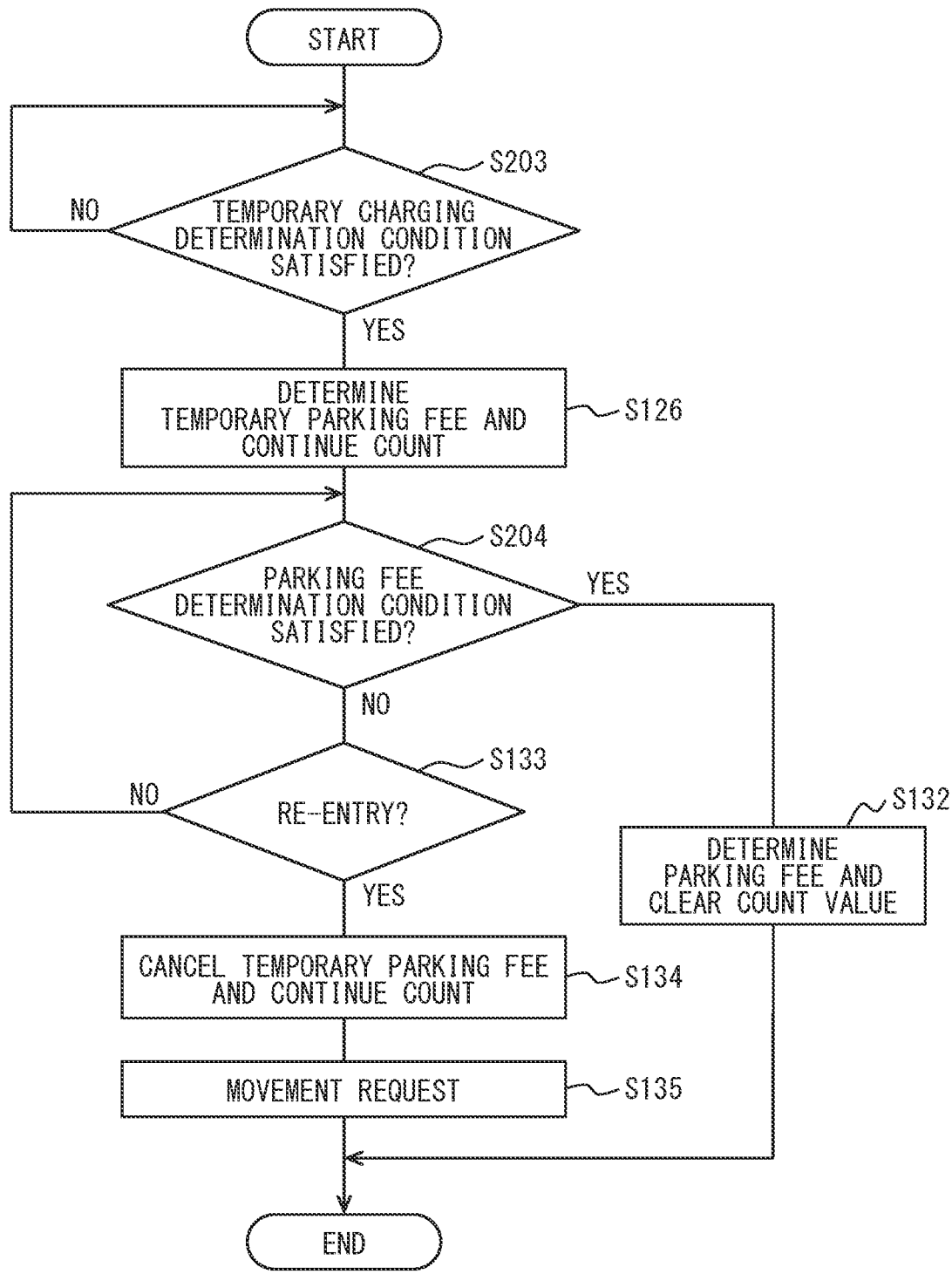
FIG. 15 is a flowchart showing a charging count termination process executed by the management device.

(2c) According to another aspect of the present disclosure, the charging count start process and the charging count termination process may be configured as follows. FIG. 14 is a flowchart showing the charging count start process executed by the management device 39 according to a modification example. FIG. 15 is a flowchart showing the charging count termination process executed by the management device 39 according to the modification example.

The following describes the difference between the above embodiment and the modification example. Although S101 to S104 are described in the above embodiment, at least one condition of S101 to S104 may be determined. The counting start condition of S201 may be set as at least one of the conditions shown in S101 to S104.

Similarly, the charging determination condition of S202 may be set as at least one of the conditions shown in S110 and S111. The temporary charging condition of S203 may be set as at least one of the conditions shown in S121 to S125. The parking fee determination condition of S204 may be set as at least one of the conditions shown in S130 and S131. The counting start condition, the charging determination condition, the temporary charging condition, and the parking fee determination condition can be properly set by a service provider of the automated valet parking lot. The counting start condition may be determined based on a parking fee determination policy of the automated valet parking lot. By adopting the flowchart according to the modification example, the present disclosure can be properly applied to various type of automated valet parking lot.

(2d) The control unit 47 and the method thereof described in the present disclosure may be implemented by a special purpose computer, which includes a memory and a processor programmed to execute one or more special functions implemented by computer programs stored in the memory. Alternatively, the control unit 47 and the method thereof described in the present disclosure may be implemented by a special purpose computer configured as a processor with one or more dedicated hardware logic circuits. Alternatively, the control unit 47 and the method thereof described in the present disclosure may be implemented by one or more special purpose computers configured by a combination of a processor and a memory programmed to execute one or multiple functions and a processor configured by one or more hardware logic circuits. The computer program may be stored in a computer-readable non-transitory tangible storage medium as instructions to be executed by the computer. The control unit 47 and the method thereof described in the present disclosure does not necessarily need to include software, and all of the functions of control unit may be implemented using one or more hardware circuits.

(2e) The multiple functions of one component in the above embodiments may be implemented by multiple components, or a function of one component may be implemented by multiple components. Multiple functions of multiple configuration elements in the above embodiments may be implemented by one configuration element, or one function implemented by multiple configuration elements may be implemented by one configuration element. A part of the configuration of the above embodiments may be omitted as appropriate. At least a part of the configuration in one embodiment may be added to or substituted for the configuration of another embodiment.

(2f) In addition to the parking assist system 1 described above, the present disclosure may be implemented in various forms, such as the management device 39 as a component of the parking assist system 1, a program to implement a computer as the management device 39, a non-transitory tangible storage medium such as a semiconductor memory storing the program, and a parking assist method.

What is claimed is:

1. A parking charge device charging a parking fee of a target vehicle in a parking lot with automated valet parking service, the target vehicle corresponding to a charging target and moving between a boarding or alighting area and a parking area within the parking lot, the parking charge device comprising:
    at least one of (i) a circuit and (ii) a processor with a memory storing computer program code executable by the processor, the at least one of the circuit and the processor is configured to cause the parking charge device to implement:
    a count start unit configured to receive a signal from a sensor, a user terminal, or a terminal device, and to start a count operation for charging purpose in response to a start condition being satisfied;
    a count termination unit terminating the count operation in response to a termination condition being satisfied;
    a parking fee calculation unit calculating a parking fee corresponding to a count value obtained by the count operation; and
    a temporary calculation unit calculating a temporary parking fee based on the count value at a detection time of an exit request;
    wherein:
    the count operation is performed by a timer circuit provided in the parking charge device and the count value is stored in a memory;
    the start condition is set to be satisfied when at least one of following is made:
        (i) reservation of the parking lot for parking the target vehicle;
        (ii) entry of the target vehicle into the parking lot;
        (iii) detection of a parking request instructed by a user for parking the target vehicle in the parking lot by automated driving;
        (iv) arrival of the target vehicle at the boarding or alighting area before moving to the parking area;
        (v) arrival of the target vehicle at the parking area; or
        (vi) transmission of a parking completion notification, which indicates the arrival of the target vehicle at the parking area, to the user;
    the termination condition is set to be satisfied when the user boards on the target vehicle within a preset duration after the target vehicle arrives at the boarding or alighting area;
    the parking fee calculation unit adopts the temporary parking fee as the parking fee corresponding to the count value when the count operation is terminated within the preset duration; and
    the parking charge device further comprises a communication unit transmitting information indicating a guidance route, which guides the target vehicle from a current position to a target position by automated driving.

2. The parking charge device according to claim 1, wherein the at least one of the circuit and the processor is further configured to cause the parking charge device to implement:
    a parking fee determination unit determining charging of the parking fee in response to a preset determination condition being satisfied after the detection of the exit request,
    wherein the parking fee calculation unit calculates the parking fee corresponding to the count value after the parking fee determination unit determines the charging of the parking fee.

3. The parking charge device according to claim 1, wherein
    the count start unit starts the count operation before or in response to the detection of the parking request.

4. The parking charge device according to claim 1, wherein the at least one of the circuit and the processor is further configured to cause the parking charge device to implement:
    a movement request unit outputting a movement request, which requests a moving of the target vehicle to the parking area, in response to the user failing to board on the target vehicle within the preset duration,
    wherein the temporary calculation unit, in response to detection of the movement request, discards the calculated temporary parking fee and calculates the temporary parking fee again based on the count value at a detection time of a next exit request.

5. The parking charge device according to claim 1, wherein the at least one of the circuit and the processor is further configured to cause the parking charge device to implement:
    a movement request unit outputting a movement request, which requests a moving of the target vehicle to the parking area, in response to a re-entry instruction from the user,
    wherein the temporary calculation unit, in response to detection of the movement request, discards the calculated temporary parking fee and calculates the temporary parking fee again based on the count value at a detection time of a next exit request.

6. The parking charge device according to claim 1, wherein
    the parking fee calculation unit adds a service fee for using the parking lot with automated valet parking service to the parking fee calculated corresponding to the count value in response to the detection of the parking request.

7. A parking duration management method executed by at least one of (i) a circuit and (ii) a processor with a memory storing computer program code executable by the processor of a management device, the management device calculating a parking duration of a target vehicle in a parking lot with automated valet parking service, the target vehicle corresponding to a charging target and moving between a boarding or alighting area and a parking area within the parking lot, the parking duration management method comprising:
    receiving a signal from a sensor, a user terminal, or a terminal device;
    starting a count operation of the parking duration in response to a start condition being satisfied;

terminating the count of the parking duration in response to a termination condition being satisfied, the termination condition being satisfied when the user boards on the target vehicle within a preset duration after the target vehicle arrives at the boarding or alighting area;

calculating a parking fee corresponding to a count value obtained by the count operation;

calculating a temporary parking fee based on the count value at a detection time of an exit request; and adopting the temporary parking fee as the parking fee corresponding to the count value when the count operation is terminated within the preset duration;

wherein:

the count operation is performed by a timer circuit provided in the management device and the count value is stored in a memory;

the start condition is set to be satisfied when at least one of following is made:

(i) reservation of the parking lot for parking the target vehicle;

(ii) entry of the target vehicle into the parking lot;

(iii) detection of a parking request instructed by a user for parking the target vehicle in the parking lot by automated driving;

(iv) arrival of the target vehicle at the boarding or alighting area before moving to the parking area;

(v) arrival of the target vehicle at the parking area; or (vi) transmission of a parking completion notification, which indicates the arrival of the target vehicle at the parking area, to the user; and the management device further comprises a communication unit transmitting information indicating a guidance route, which guides the target vehicle from a current position to a target position by automated driving.

* * * * *